United States Patent [19]

Frater et al.

[11] Patent Number: 4,479,090

[45] Date of Patent: Oct. 23, 1984

[54] CIRCUITRY FOR MEASURING MAGNETIC HEAD FLYING CHARACTERISTICS

[75] Inventors: Norman K. Frater; Stanley S. Hoo, both of San Jose; William H. McConnell, Los Altos, all of Calif.

[73] Assignee: International Business Machines Corporation, Armonk, N.Y.

[21] Appl. No.: 431,404

[22] Filed: Sep. 30, 1982

[51] Int. Cl.³ .......................................... G01N 27/60
[52] U.S. Cl. .............................................. 324/454
[58] Field of Search ............... 324/113, 452, 454, 457; 360/103; 340/677

[56] References Cited

U.S. PATENT DOCUMENTS

| | | | |
|---|---|---|---|
| 568,205 | 9/1896 | Norden | 340/677 |
| 3,601,694 | 8/1971 | Checketts et al. | 324/454 |
| 3,737,569 | 6/1973 | Snelling | 324/454 |
| 3,855,625 | 9/1979 | Watrous | 360/103 |
| 4,167,765 | 12/1974 | Garnier et al. | 360/103 |

OTHER PUBLICATIONS

Rothgordt et al., "Triboelectric Charging of Thin Foils and Its Application to a New Recording Principle", IEEE Transactions, vol. IA-13, May/Jun. 1977, pp. 223-226.

Primary Examiner—Michael J. Lynch
Assistant Examiner—Kevin D. O'Shea
Attorney, Agent, or Firm—Walter J. Madden, Jr.

[57] ABSTRACT

A method for monitoring characteristics of a magnetic recording head which is flying in an air bearing relationship over a rotating magnetic recording disk containing $Fe_2O_3$ detects triboelectric charges generated by intermittent contact between the head and the disk and also detects modulations in the spacing between the head and the disk surface when the two are not in contact.

5 Claims, 7 Drawing Figures

CIRCUITRY FOR MEASURING MAGNETIC HEAD FLYING CHARACTERISTICS

BACKGROUND OF THE INVENTION

1. Field of the Invention

This invention relates to devices and circuitry for measuring characteristics of a magnetic recording head which is flying in an air bearing relationship over a rotating magnetic recording disk.

2. Description of Prior Art

In current magnetic recording disk files, a magnetic recording head mounted in an air bearing slider assembly is supported in close proximity to a rotating magnetic recording disk. With present disk files, this spacing is less than 20 microinches and the trend for future files is to even smaller spacings in order to increase areal recording density. With such small spacings and relatively fragile suspension mechanism for the slider, any disturbance of the air bearing which results in contact between the slider and the rotating disk can lead to disaster for both the slider and the disk. This problem is complicated with those disks which contain load-bearing particles, such as $Al_2O_3$, since such particles often extend above the disk surface and hence have an increased chance of being contacted by the slider.

In this environment, it would be useful to have the ability to test an assembled disk file to determine the amount of contact between the rotating disks and their associated slider assemblies and to remove any disk which appeared to result in excessive contact with a slider assembly.

Glide height testing on current magnetic disk files measures induced head/slider motions that result from the interaction of the slider and any disk defect or asperity on the disk surface. There are several problems with this approach:

1. Special test sliders are required.
2. The dynamics of each test slider must be calibrated.
3. The response of a slider to a disk defect, particularly a narrow particle such as $Al_2O_3$ in the disk, depends not only on the defect height but also upon the stiffness of the particle in the substrate and the stiffness of the air bearing.
4. The transducer used in the test slider is generally not part of the magnetic function in the file. Hence, either special test sliders are required, or the slider is fabricated with extraneous, non-magnetic devices.

SUMMARY OF THE INVENTION

The present invention utilizes the natural charge transfer of two bodies of different material which are in motion relative to each other to generate signals which give an indication of any intermittent contacts between the bodies and which also give a measure of spacing changes between the bodies when they are not in contact.

DESCRIPTION OF THE PREFERRED EMBODIMENT

Figure 1A:
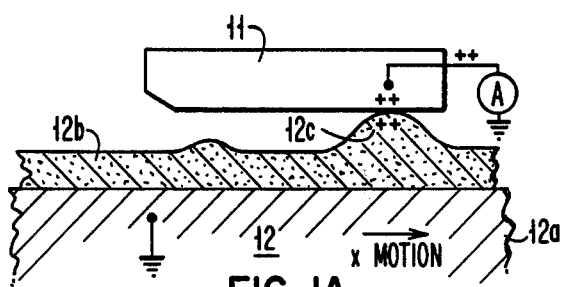
FIG. 1A is a schematic representation of the situation in which a magnetic, or glide height test, head contacts an asperity on a rotating magnetic recording disk to generate triboelectric current.
Figure 1B:
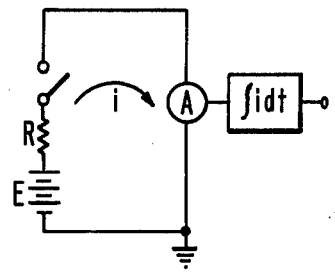
FIG. 1B is a diagram of the electrical equivalent of FIG. 1A.

Triboelectric charges are generated when two materials which are different in the triboelectric series are rubbed together, the sign of the charge being determined largely by the nature of the materials in contact, and the quantity of the charge generated is a function of the nature of the materials and the area of contact. FIG. 1A is a representation of the generation of triboelectric charges by intermittent contact between a magnetic head in a slider assembly and the surface of a magnetic recording disk. The slider assembly 11, which carries a magnetic transducer for writing and reading on the magnetic recording surface, may be of any suitable type such as that shown in U.S. Pat. No. 3,855,625. Slider 11 is supported in an air bearing relationship less than 20 microinches above the surface of a magnetic recording disk 12 on a suspension such as shown in U.S. Pat. No. 4,167,765. Disk 12 includes a metallic substrate 12a on which is deposited a magnetic recording layer 12b. Layer 12b may be of any suitable type, such as that described in U.S. Pat. No. 3,058,844, including an epoxy-phenolic binder system having magnetic particles of gamma $Fe_2O_3$ dispersed therein. Metallic film disk layer 12b may also include head load-bearing particles 12c of a suitable material, such as $Al_2O_3$, as taught in U.S. Pat. No. Re. 28,866. These particles 12c are usually larger than the magnetic particles in the coating and some of them may extend above the nominal surface of layer 12b, even after buffing and polishing of the disk surface. As shown in FIG. 1A, one such load-bearing particle 12c is shown making a momentary contact with the air bearing surface of slider 11. Because the material of slider 11 and that of the magnetic recording layer 12 are different in the triboelectric series, this contact generates a triboelectric charge which is utilized in the present invention to monitor the occurrence of such contacts. The electrical equivalent of this is shown in FIG. 1B where the triboelectric potential represented by battery E causes a triboelectric current i to flow against a resistance R, this charge being the time integral of current i between the limits of $t_1$ and $t_2$, being measurable in an integrating ammeter A.

Figure 2A:
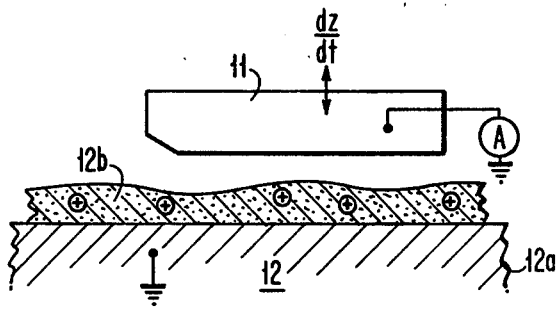
FIG. 2A is a schematic representation of the situation in which a magnetic head is spaced a varying distance from a rotating magnetic disk.
Figure 2B:
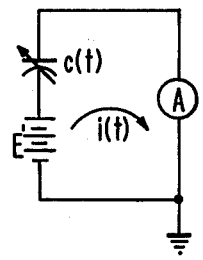
FIG. 2B is a diagram of the electrical equivalent of FIG. 2A.

In addition to this triboelectric charge, magnetic recording disks which contain magnetic iron oxide or other deposited magnetic layers hold a permanent electric charge, much like an electret. This results in a constant electric potential of approximately 300 millivolts measured between the air above the surface of recording disk 12 and the disk substrate 12a. A flying conductive head whose spacing from the disk surface varies during disk rotation generates a displacement current which is directly proportional to the spacing modulation dz/dt. This is shown in FIG. 2A with conductive slider 11 moving in the z direction above the surface of magnetic recording disk 12. The electrical equivalent of this is shown in FIG. 2B where the spacing modulations have the effect of a variable capacitance C(t) to vary the current i(t) resulting from the permanent electric charge represented by battery E'. The equations governing this are as follows:

$$i(t) = \frac{dq}{dt} = \frac{d(VC)}{dt} = V\frac{dc}{dz}\frac{dz}{dt} + C\frac{dv}{dx}\frac{dx}{dt}$$

for $\frac{dv}{dx} \sim 0$ $$i(t) \simeq V\frac{dC}{dz}\frac{dz}{dt}$$

(C being the capacitance between slider 11 and disk substrate 12a.)

The current is what is known in the art as displacement current, being generated by a time-varying capacitor in series with a substantially constant voltage source, which is the bound electrete charge in the disk coating.

The present invention employs both the triboelectric charges generated by contacts between the slider and the disk surface and the modulation produced by variations in the spacing between the slider and the disk to continuously monitor both the occurrence and severity of such contacts and variations in the spacing when the slider and disk are not in contact.

Figure 3:
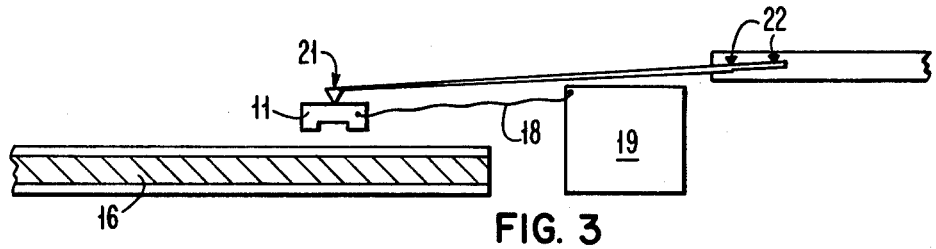
FIG. 3 diagrammatically shows the essential elements of the present invention.

The essential elements of the present invention are shown in FIG. 3, and include:

1. A regular slider 11 the air bearing body of which must be slightly conductive. (Resistivity of less than $10^6$ Ω-cm).

2. A magnetic disk having an electrically grounded substrate 16.

3. Electrical isolation between the slider and grounded conductors in the head/suspension/disk system such as 21 or 22.

4. A conductive contact 18 to slider 11 leads to the current measuring circuitry 19.

5. The disk and the slider must be in relative tangential motion.

Figure 4:
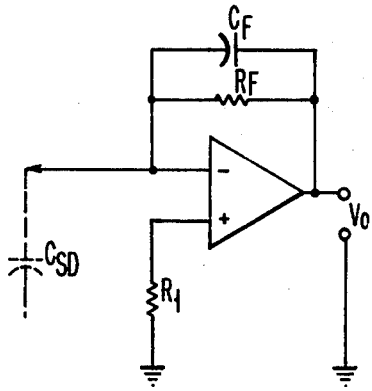
FIG. 4 is a diagram of one embodiment of circuitry for carrying out the present invention to monitor both intermittent contacts between a magnetic head and asperities on a rotating magnetic recording disk, and spacing modulations between the head and the disk.

One preferred embodiment for the current measuring circuitry 19 is a single operational amplifier connected in the "trans-impedance" mode as shown in FIG. 4.

$R_1$ is selected to minimize the dc offset voltage at $V_o$.

$C_{SD}$ is the slider-to-disk capacitance, a typical value being approximately $10^{-10}$ Farads, when the slider is in flight.

$C_F$, $R_F$ are the feedback capacitor and resistor, respectively. Their values are selected to give a closed-loop frequency response shown in FIG. 5. This is given by the equation:

$$G_{CL}(j2\pi f) = \frac{-j2\pi fR_FC_{SD}}{1 + j2\pi fR_FC_F}$$

j equals the square root of $-1$

The trans-impedance circuitry above is well known, see, for example, *Operational Amplifiers*, edited by Tobey, Graeme and Huelsman, McGraw-Hill, 1971.

Figure 5:
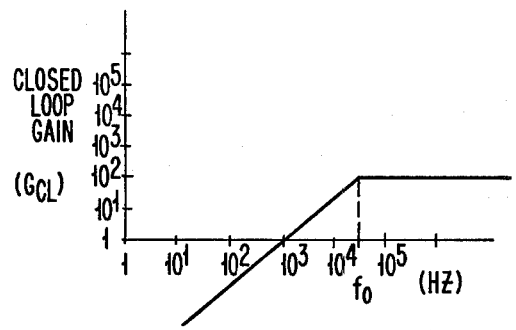
FIG. 5 is a graph showing the preferred closed-loop frequency response of the detection circuitry.

The closed loop response, FIG. 5, is tailored to detect both the glide (non-contact) and the contact modes of the slider. These modes are separated in the frequency domain.

The glide mode frequency, being directly set by the effective mass (M) of the slider and the air-bearing stiffness (k) is band-limited. This $f_o$ in FIG. 5 is set to be slightly above the glide mode frequency;

$$\frac{1}{2\pi}\sqrt{\frac{k}{M}}$$

Typically, this is about 50 Kilo-Hertz for present day sliders. In frequency ranges up to $f_o$, the circuitry in FIG. 4 acts as a current-to-voltage converter.

Above $f_o$, where fast contacts occur, the circuitry acts as an inverting charge amplifier.

Thus in one simple circuit, both glide and contact modes of the slider are detected and resolved simultaneously.

It has been found that there are significant differences in both the sign and the amount of triboelectric charge released in a contact between a sintered T,C slider member with $Al_2O_3$ therein and (a) disk alumina particles, (b) an unlubricated magnetic disk coating containing $Fe_2O_3$ and a binder therefor, and (c) a fluorocarbon lubricant material applied to and overlying the magnetic disk coating. For contact between the slider and dry alumina particles, the charge is negative; for contacts with the unlubricated coating, the charge is small and positive; and for contacts with the lubricant, or lubricated particles, the charge is positive and relatively large.

By so monitoring the sign and the magnitude of the contact signals, the material composition of the disk protrusions can be differentiated and classified.

It is clear that other slider and disk material pairs can be likewise investigated and classified. Therefore, this invention, in addition to performing glide and contact testing, teaches a means to inspect the material composition of undesirable disk protrusions.

Among the advantages of the technique of the present invention are: (a) head contact with actual surface protrusions is measured without having to subtract out any disk coating thickness variations, as in capacitive glide height testing systems, or spacing modulations without contact but misinterpreted as head/disk contact as in both capacitive and piezoelectric glide systems; and (b) head spacing modulations alone are also measured by this technique.

Another important advantage of the present method is that no extra transducer is fabricated onto the slider and that no external measuring voltages or currents are injected into the slider/disk interface. Thus, the actual magnetic components are used to perform disk testing.

By incorporating this technique in a magnetic storage file, the disks can be monitored continuously throughout their operating life.

While the description given here for this invention applies directly to rigid disk systems with air-bearing sliders, this invention is not limited to this system alone. Magnetic tape systems, flexible media magnetic disk systems ("Floppy"), contact probe capacitive disk systems such as the RCA playback system all can benefit from the present invention.

We claim:

1. A method of monitoring characteristics of a magnetic recording head flying in an air bearing relationship relative to a rotating magnetic recording disk, said magnetic recording disk comprising a dispersion of magnetic particles and load-bearing particles in a binder system, at least some of said load-bearing particles extending above said disk surface, the material of the face of said magnetic head adjacent said disk surface being different in the triboelectric series from said load-bearing particles and said disk surface, comprising the step of detecting the triboelectric charge generated by intermittent contact between said head and said disk surface to provide an indication of the frequency of said contacts.

2. A method in accordance with claim 1 including the step of detecting the sign and quantity of triboelectric charge generated by intermittent contact between said head and said disk surface to provide an indication of the frequency of said contacts and whether said contact was with said load-bearing particles or said disk surface.

3. A method in accordance with claim 1 in which said magnetic recording disk has a lubricant material applied to the surface thereof, said lubricant material being different in the triboelectric series from said material in said face of said magnetic head and from unlubricated portions of said disk surface, comprising the step of detecting the difference between contacts of said head with said lubricant material and with said unlubricated portion of said disk surface.

4. A method of monitoring characteristics of a magnetic recording head flying in an air bearing relationship relative to a rotating magnetic recording disk, said magnetic recording disk comprising a magnetic layer, the material of the face of said magnetic head adjacent said disk surface being different in the triboelectric series from said magnetic layer, a voltage existing between said face of said magnetic head and said magnetic layer by virtue of the presence of said magnetic layer, comprising the step of detecting the triboelectric charge generated by intermittent contact between said head and the surface of said said magnetic layer to provide an indication of the frequency of said contacts and detecting variations in the capacitance between said face of said magnetic head and said disk surface as reflected by variations in said charge to provide an indication of modulation in the spacing between said face of said magnetic head and said surface of said magnetic layer.

5. A method in accordance with claim 4 including the step of detecting the sign and quantity of triboelectric charge generated to provide an indication of the frequency of said contacts.

* * * * *